US009397561B2

(12) United States Patent
Barlage et al.

(10) Patent No.: US 9,397,561 B2
(45) Date of Patent: Jul. 19, 2016

(54) FREQUENCY DEPENDENT ANALOG BOOST CONVERTER FOR LOW VOLTAGE APPLICATIONS

(71) Applicant: The Governors of the University of Alberta, Edmonton (CA)

(72) Inventors: Douglas Barlage, Edmonton (CA); Lhing Gem Kim Shoute, Edmonton (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 91 days.

(21) Appl. No.: 14/517,008

(22) Filed: Oct. 17, 2014

(65) Prior Publication Data
US 2015/0108961 A1    Apr. 23, 2015

Related U.S. Application Data (60) Provisional application No. 61/892,302, filed on Oct. 17, 2013.

(51) Int. Cl.
*H02M 3/10* (2006.01)
*H02M 3/155* (2006.01)
*H02M 3/156* (2006.01)
*H02M 3/158* (2006.01)
*H02M 3/338* (2006.01)
*H02M 1/08* (2006.01)

(52) U.S. Cl.
CPC ............. *H02M 3/156* (2013.01); *H02M 1/08* (2013.01); *H02M 3/1563* (2013.01)

(58) Field of Classification Search
CPC ....... H02M 3/10; H02M 3/155; H02M 3/156; H02M 3/158; H02M 3/338; H02M 3/3385
USPC ........................................ 363/18, 158, 21.02
See application file for complete search history.

(56) References Cited

U.S. PATENT DOCUMENTS

| 4,605,999 | A | * | 8/1986 | Bowman | ................ | H02M 3/338 |
| | | | | | | 323/248 |
| 4,685,041 | A | * | 8/1987 | Bowman | ................. | H02M 3/28 |
| | | | | | | 363/126 |
| 4,903,182 | A | * | 2/1990 | Pilukaitis | ......... | H03K 17/04123 |
| | | | | | | 323/289 |
| 2015/0303806 | A1 | * | 10/2015 | Madsen | ................ | H02M 3/158 |
| | | | | | | 323/271 |

* cited by examiner

*Primary Examiner* — Timothy J Dole
*Assistant Examiner* — Sisay G Tiku
(74) *Attorney, Agent, or Firm* — LeClairRyan, a Professional Corporation (57) ABSTRACT

An analog open-loop self-oscillating boost converter is provided including: an output terminal for supplying an output voltage bus; an input terminal for receiving variable input power; a varactor positioned in series with the input terminal; and an oscillating network having an inductor, a resistor and a capacitor in a parallel orientation, the oscillating network connected to a semiconductor device and the varactor.

22 Claims, 6 Drawing Sheets

FREQUENCY DEPENDENT ANALOG BOOST CONVERTER FOR LOW VOLTAGE APPLICATIONS

RELATED APPLICATIONS

This application claims the benefit of U.S. Provisional Patent Application No. 61/892,302 filed Oct. 17, 2013, which is hereby incorporated by reference in its entirety.

FIELD

The present invention relates to analog DC-DC boosting circuits, and more particularly to such circuits configured to provide voltage stabilization from a variable input source.

BACKGROUND

Emerging alternative energy sources, although offering a promising future, suffer from unstable input sources. To resolve this problem DC-DC converters may be used as a stabilizing circuit; and, in the case of a well-known boosting topology, a low varying input voltage can be boosted to provide a stable output voltage capable of delivering required potential for a multitude of applications. Typically, such a circuit is a LC circuit, including an inductor and a switch responsible for the voltage boost, as well as a rectifying device and a ripple minimizing capacitor. The gain of the overall circuit is strictly dependent on the nature of the waveform fed to the switch—i.e. a transistor. Two approaches in particular are available: fixed-frequency/varying pulse-width or pulse-width modulation (PWM) converters, and varying-frequency/fixed pulse-width or resonant converters.

PWM converters dominate the market primarily due to their circuit simplicity and ability to offer a voltage gain greater than unity. More specifically, the voltage gain is provided by the boost converter topology. The most common method of dictating the switching behaviour of the boosting circuit's transistor is through n extrinsic source, usually in form of a digital microcontroller (MCU). The incompatibility between a digitally driven switch and the use of circuits operational at higher frequencies lies in the latter's objective to minimize both the area employed by the circuit and its bulk costs. To further elaborate, if localized boosting is required for an unstable input source, the digital approach is rendered unfeasible given the size needed for the MCU.

The need for an extrinsic source for the transistor is eliminated in a resonant converter in which the LC network causing the self-oscillation at resonance is implemented within the circuit, which in turn determines the switching behaviour. The resonant converter is also operable at higher frequencies which allows for the miniaturization of component sizes, making it ideal for integrated circuit applications. Unfortunately, this class of converters poses the gain limitation of at most unity, which is achieved only at resonance.

Figure 1:
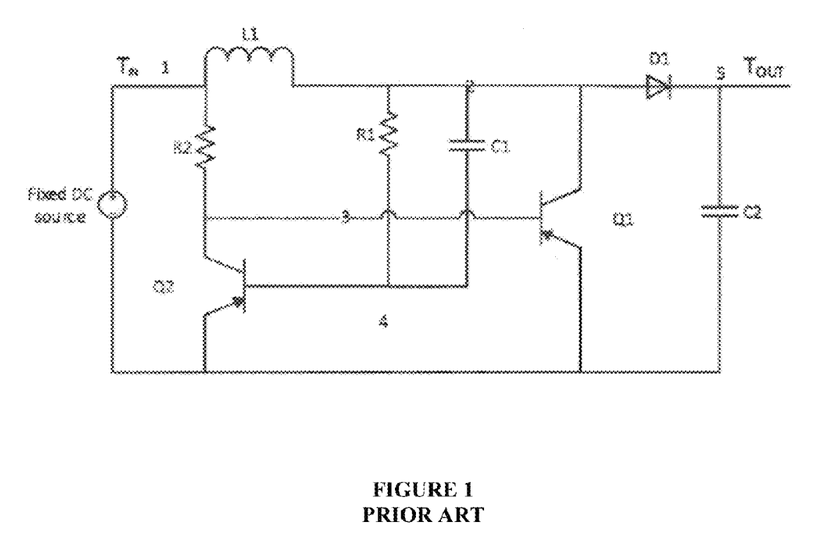
FIG. 1 is the circuit schematic of a prior art self-oscillating boost converter which adopts a single frequency and a single duty which contains no mechanism for regulation.

FIG. 1 displays a circuit schematic of a typical prior art self-oscillating boost converter which adopts a single frequency and a single duty which contains no mechanism for regulation. The circuit includes components such as inductor (L1); rectifying diode (D1); and ripple-free capacitor (C2). The output terminal ($T_{OUT}$) is taken at the positive terminal (5) of capacitor (C2). The self-oscillating network includes capacitor (C1) and resistor (R1) in parallel with their low-terminal (4) connected to oscillating bipolar junction transistor Q2. The circuit also includes input terminal ($T_{IN}$).

SUMMARY

The deficiencies described above are limiting factors in the pursuit of integrated variation of circuits realized only through the minimization of both size and cost. The invention presented herein combines the greater-than-unity gain characteristics of a PWM boost converter and the self-driving feature of the resonant converter, thus providing a topology compatible for integrated implementation. The system according to the invention includes an inductor, which helps the boosting of the input voltage, a transistor, whose switching speed regulates the rate at which the current is passed through the inductor, and a rectifier and capacitor to smooth the output voltage.

In terms of functionality, the switch may be driven either internally or externally. An autonomous converter is realized with the inclusion of three components: a capacitor and resistor in parallel, which are subsequently tied to the gate of a second transistor, which sustains the oscillation. While the prior art proposes a self-driven circuit topology, it is limited to a single frequency and duty cycle as there is no available mechanism within the topology to adopt other distinct values. This limitation is resolved with the introduction of reactive components capable of modification given a certain stimulus provided externally.

When placed at points where the stimulus is known to be inconstant, a device to adjust the reactance is provided. Such a device is known as a varactor (variable capacitor) or a varicap. The varactor is a semiconductor device, and depending on the bias it experiences at its terminals, a corresponding capacitance value is achieved. In the present invention, the points where the stimulus to the varactor has an appreciable impact may be the input or the output of the overall circuit.

The output voltage may be regulated by placing the varactor at either the input or output to the circuit: in this document, if the input is selected, then the "open-loop" configuration is the preferred option; the "closed-loop" configuration is preferred if the varactor is to be dictated by the output. While a traditional varactor can be utilized for the former configuration, in the case of the latter, a modified semiconductor according to the invention can be used. This topology is referred to herein as the "compound varactor" which includes a feedback network.

An analog open-loop self-oscillating boost converter is provided including: an output terminal for supplying an output voltage bus; an input terminal for receiving variable input power; a varactor positioned in series with the input terminal; and an oscillating network having an inductor, a resistor and a capacitor in a parallel orientation, the oscillating network connected to a semiconductor device and the varactor.

The resistor may limit the current entering a gate of a switch. The converter may further include a switching semiconductor device, the gate of the switching semiconductor device connected to a drain of the switch.

The inductor may be a fractal loop inductor, which may be a Hilbert and Koch fractal. The fractal loop inductor may be a $0^{th}$, $1^{st}$, $2^{nd}$ or $3^{rd}$ order fractal loop. The fractal loop may include a plurality of conductive paths and may have a single fabrication layer.

An analog closed-loop self-oscillating boost converter is provided, including: an output terminal for supplying an output voltage bus; an input terminal for receiving variable input power; a varactor positioned in series with the input terminal; an oscillating network having an inductor, a resistor and a capacitor in a parallel orientation, the oscillating network connected to a semiconductor device and the varactor; and a feedback network from the output terminal to the input terminal The feedback network may include a second varactor or variable capacitor. The feedback network may be configured to maintain a desired stable output voltage at the output terminal The input terminal may receive a varying voltage input.

The inductor may be a fractal loop inductor, which may be a Hilbert and Koch fractal. The fractal loop inductor may be a $0^{th}$, $1^{st}$, $2^{nd}$ or $3^{rd}$ order fractal loop. The fractal loop may include a plurality of conductive paths and may have a single fabrication layer.

A varactor is provided, including: a compounded semiconductor device, the device having a capacitance, the capacitance configurable according to a voltage input to the device; a DC path from an input terminal to an output terminal, the DC path minimizing power losses from the input terminal to the output terminal; and an AC path comprising parasitic capacitance properties of the structure for contributions to the oscillation and the modulation of its frequency.

BRIEF DESCRIPTION OF THE DRAWINGS

FIG. 8(a) shows a fabricated base inductor and dimensional definitions. The set of 1st order structures are shown in FIGS. 8(b) to 8(f) wherein 8(b) has 3 bases, 8(c) 5 bases, 8(d) 7 bases; 8(e) a 2nd-3O order fractal and 8(f) a 3rd -3O order simulated fractal. FIG. 8(g) displays an example of a control (ctrl) structure shown is the 3rd order series equivalent.

DETAILED DESCRIPTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "low voltage" means the voltage range supplied to a gate that is anywhere below 1.5 times the turn-on voltage of the transistor. All voltages above the threshold voltage are considered "high voltage".

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. section 1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

Figure 2:
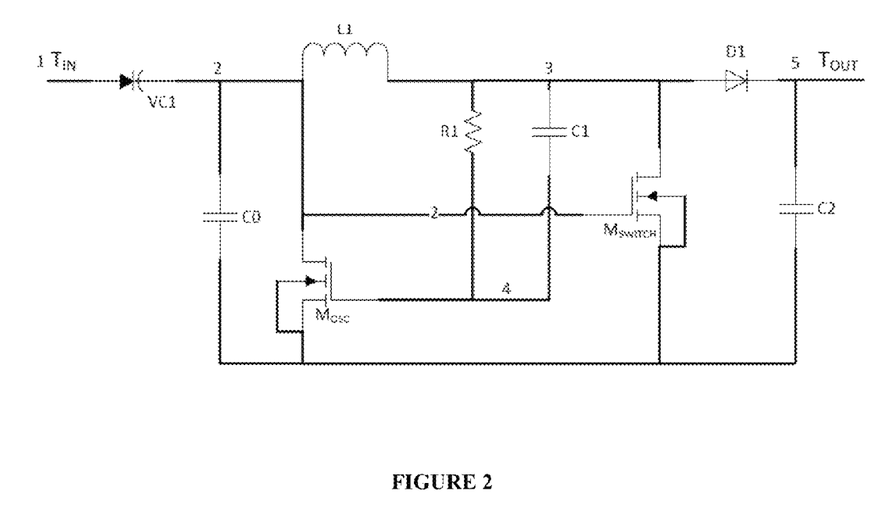
FIG. 2 shows an embodiment of an "open-loop" circuit schematic according to the invention.

FIG. 2 shows an embodiment of a circuit topology according to the invention in which the circuit functions as a frequency-dependent gain boost converter. The circuit includes cardinal DC-DC converter components such as inductor (L1); switching semiconductor device ($M_{switch}$); rectifying diode (D1); and ripple-free capacitor (C2). The output terminal ($T_{OUT}$) is taken at the positive terminal (5) of capacitor (C2).

Figure 3:
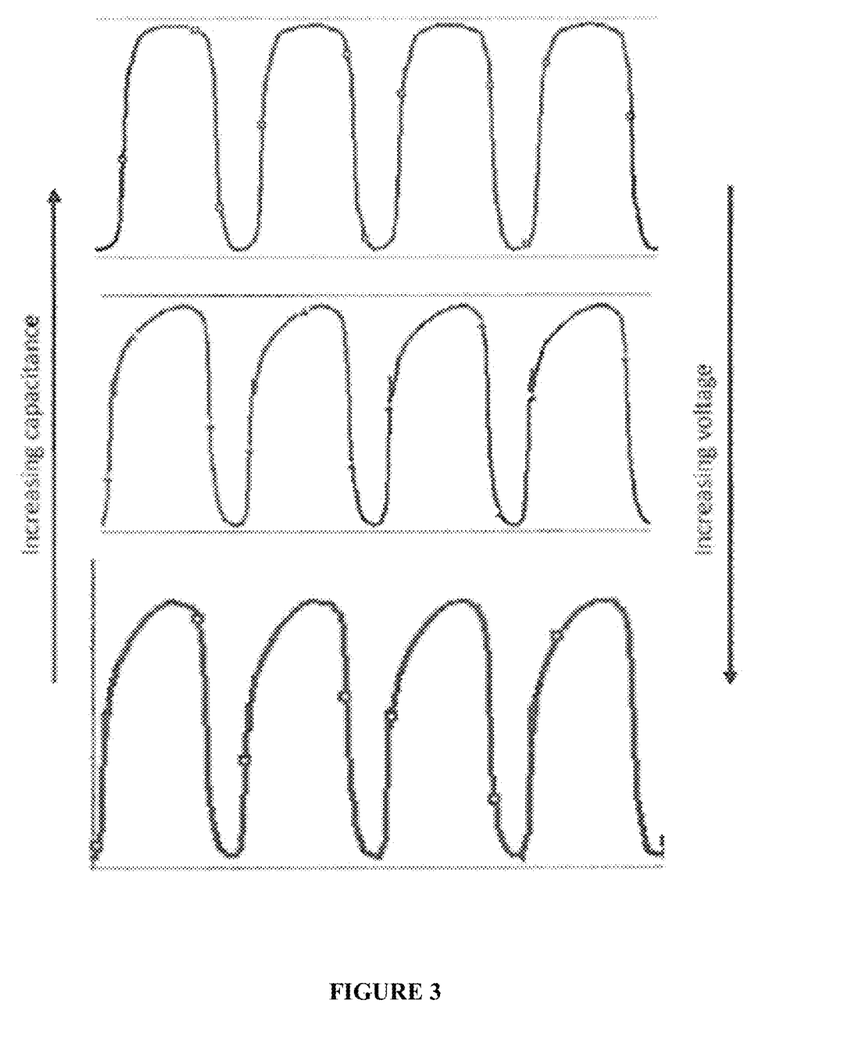
FIG. 3 shows the essential characteristics of the waveform which drives the switch of the converter schematic presented in FIG. 2.

The self-oscillating network includes capacitor (C1) and resistor (R1) in parallel with their low-terminal (4) connected directly to the gate of the second switch ($M_{osc}$), a third input capacitor (C0) placed in parallel with the input source and, finally, a varactor (VC1) situated between the onset of node (2) of the inductor (L1) and the circuit's input terminal ($T_{IN}$). The gate of switching semiconductor device ($M_{SWITCH}$) is tied to the drain, also at node (2) of second switch ($M_{OSC}$); a sample waveform of the resultant signal is shown in FIG. 3. Introducing the varactor (VC1) into the overall LC-network allows for the modulation of the self-resonant frequency which dictates the gain of the circuit. The varactor is oriented such that a higher applied voltage results in an increase of capacitance; while a low voltage exhibits the opposite effect. The varactor (VC1)'s capacitance is varied according to the voltage applied at input terminal ($T_{IN}$) at node (1) with respect to node (2).

In use, beginning from node (2), current enters inductor (L1), charging it until the peak current is reached. During the charge-up interval, the voltage at node (2) is sufficient to turn on switching semiconductor device ($M_{SWITCH}$) while second switch ($M_{OSC}$) is off. As the inductor (L1) begins to discharge, the rapid change in current through inductor (L1) causes a boost in voltage at node 4. Switching semiconductor device ($M_{SWITCH}$) remains on as inductor (L1) discharges while simultaneously charging capacitor (C1) until the maximum electromotive force induced by inductor (L1) is attained. Resistor (R1) limits the current entering the gate of second switch ($M_{OSC}$) and also determines the time of discharge of capacitor (C1). This subsequently turns on second switch ($M_{OSC}$), creating a short-circuit path and thus dropping the voltage such that switching semiconductor device ($M_{SWITCH}$) is turned off. When this occurs, rectification takes place at rectifying diode (D1) and the ripple is minimized by capacitor (C2). The inclusion of the varactor (VC1) between node (1) and node (2) introduces instability and influences the frequency of the gate drive signal of switching semiconductor device ($M_{SWITCH}$); in essence, varactor (VC1) controls the amount of current that initially enters inductor (L1) and thus determines the time at which inductor (L1) begins to discharge. Capacitor (C0) ensures that the highest voltage provided by the unstable source is held at node (2) at its maximum charge capacity.

FIG. 3 also shows that at lower capacitance and thus lower frequencies, the peak voltage of the pulse applied at the gate of switching semiconductor device ($M_{SWITCH}$) is greater than at larger values. In the perspective of the behaviour of switching semiconductor device ($M_{SWITCH}$) alone, the variance of the gain of the boost converter is obtained because the bias of the gate also varies. As with all transistor devices, if the level of bias is increased at the gate with respect to the source, the current throughput is also increased. Consequently, there is an enhancement in the voltage boost due to the nature of inductor (L1). In general, if the signal feeds a higher peak-voltage, the greater the gain and vice versa for lower on-state-voltage values.

Figure 4:
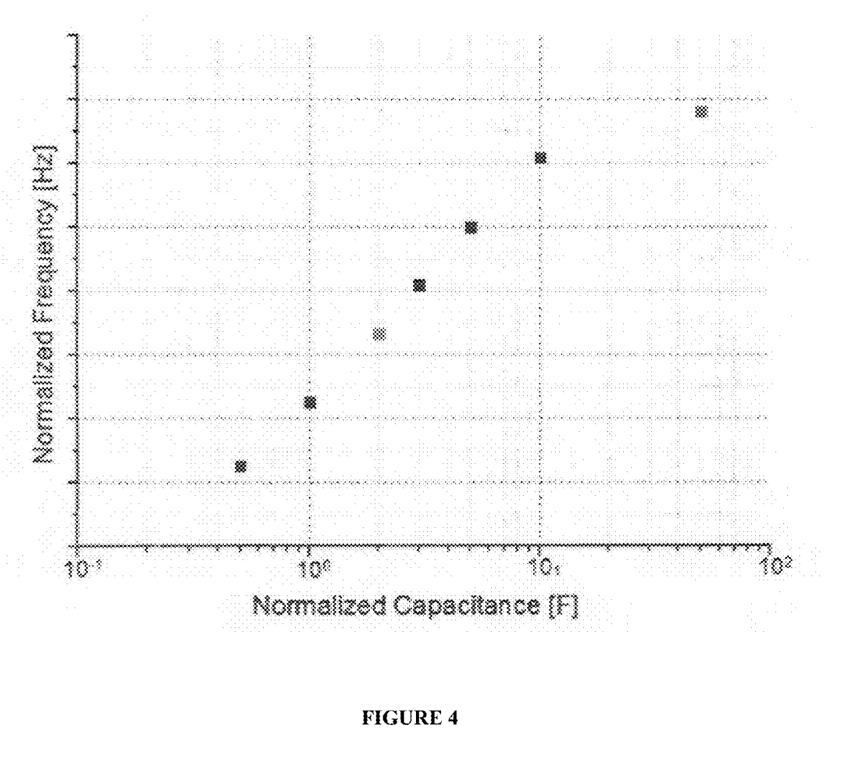
FIG. 4 shows the relationship between the frequencies of an embodiment of a circuit according to the invention in response to the variance of the capacitance in a normalized scale.

In the open-loop configuration, the varactor (VC1)'s value is determined by the variable input voltage source. It is oriented such that at higher input voltages, a higher capacitance value is adopted; and the converse is true for lower input voltages. As shown in FIG. 4, capacitance and the corresponding frequency is positively correlated.

Assume the boost converter operates at some self-resonant frequency and provides its corresponding gain at output terminal ($T_{OUT}$) when a certain voltage is experienced at input terminal ($T_{IN}$) at time t0. When the varying input voltage source provides a higher potential at input terminal ($T_{IN}$) at a time t1 greater than t0, the depletion width of varactor (VC1) is subsequently decreased, which in turn increases capacitance. This rise in the overall capacitance of the circuit at t1 results in the increase of the self-resonant frequency, causing output terminal ($T_{OUT}$) to experience a reduced gain. Similarly, a lower input voltage at input terminal ($T_{IN}$) results in the narrowing of the depletion width of varactor (VC1), leading to lower capacitance and operating frequency, which consequently increases the voltage gain. The operation of varactor (VC1) described above is the reverse of the behaviour that is traditionally expected given the external stimulus. However, the desired mechanism of operation is consistently observed even in conventional active devices and can be exploited accordingly.

Figure 5:
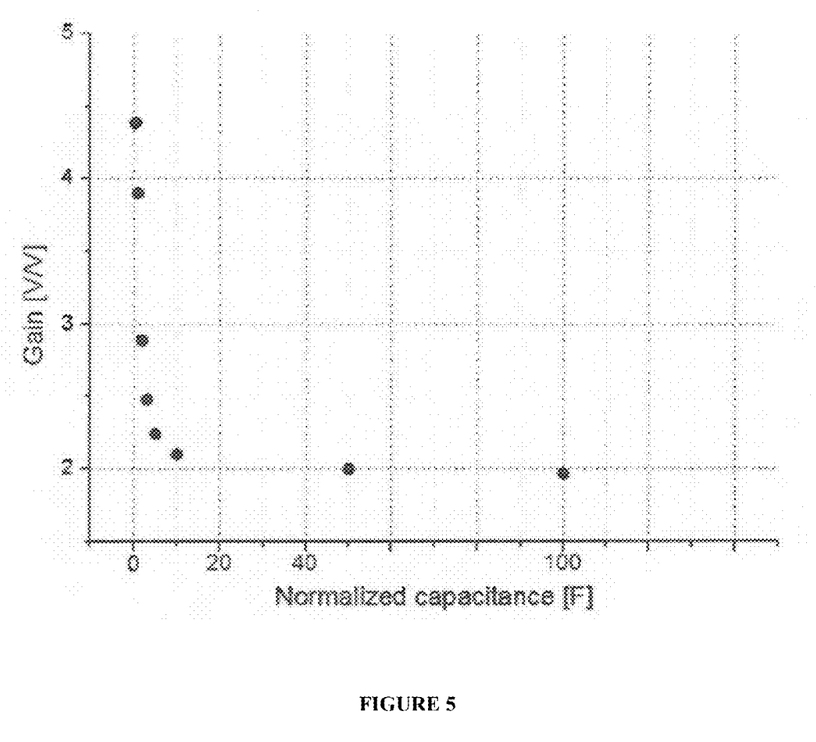
FIG. 5 shows the relationship between the gain of an embodiment of the circuit according to the invention in response to the variance of the capacitance in a normalized scale.

The variance of the varactor (VC1) capacitance with respect to its bias requires the oscillation of the converter to be highly sensitive to miniscule capacitive changes. Examination of gain versus capacitance shown in FIG. 5 reveals that this requirement is met. The domain representing normalized capacitance spans from the $0^{th}$ order ($10^0$) at the highest gain to the $2^{nd}$ order ($10^2$) at the lowest gain, with the most sensitive region spanning from the $0^{th}$ order to the $1^{st}$ order. This indicates that the operating conditions the converter requires of the varactor (VC1) are available.

The varactor (i.e. the variable capacitor) can be provided in alternate embodiments. For example, a diode in series with a capacitor (that stays constant) can be used. In such an embodiment, the JUNCTION capacitance of the diode ($C_{jo}$) is what varies, which in turn modulates the effective output capacitance. Other embodiments of variable capacitors can also be used with the boost converter.

Figure 6:
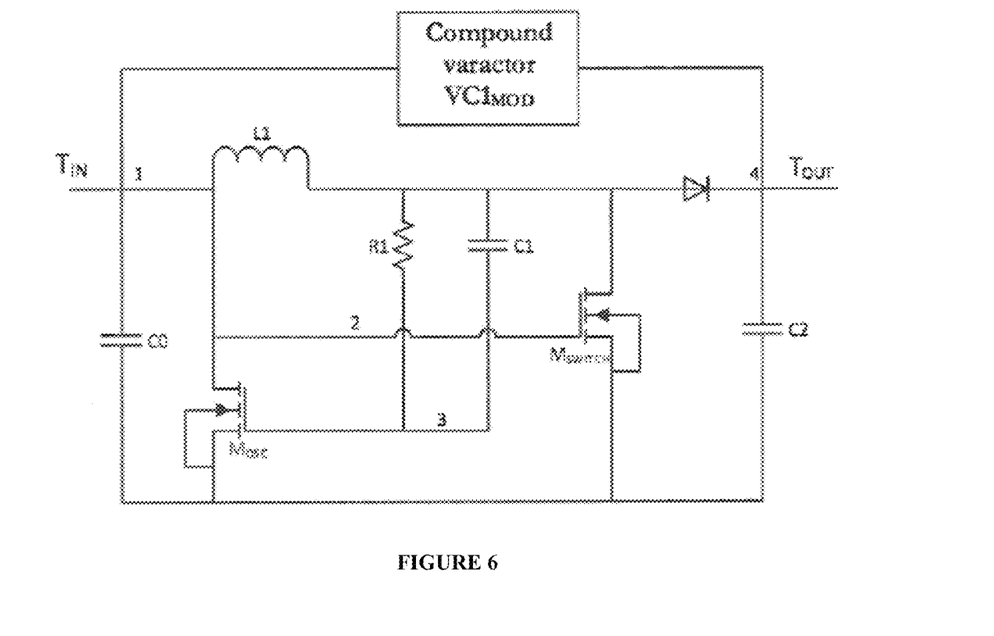
FIG. 6 is a "closed-loop" circuit schematic of an embodiment of a circuit according to the invention.

As shown in FIG. 6, the inclusion of a feedback network from output terminal ($T_{OUT}$) to input terminal ($T_{IN}$), creates a closed-loop circuit. A "compound varactor" device ($VC1_{MOD}$) between node (1) and node (4) is the sole component making up the feedback network. In this embodiment, the gain of the circuit, and thus the capacitance and the operating frequency, is dictated by the voltage experienced at output terminal ($T_{OUT}$). The voltage at output terminal ($T_{OUT}$), $V_{OUT}$, biases compound varactor ($VC1_{MOD}$) such that it adopts the desired capacitance value. The construction of compound varactor ($VC1_{MOD}$) is such that DC signals are prevented from passing, while the capacitive network within compound varactor ($VC1_{MOD}$) provides the path of least resistance for the AC signals which result from the oscillation of the converter.

The closed loop circuit offers several advantages. In particular, if a specific output voltage is desired at output terminal ($T_{OUT}$), it can be maintained through the modulation of compound varactor ($VC1_{MOD}$) in a similar manner as described in the open-loop case. Additionally, an output-regulated converter relinquishes the restriction on voltage-varying input sources and can now be replaced with any available energy harvesting technologies with an unstable input.

Figure 7:
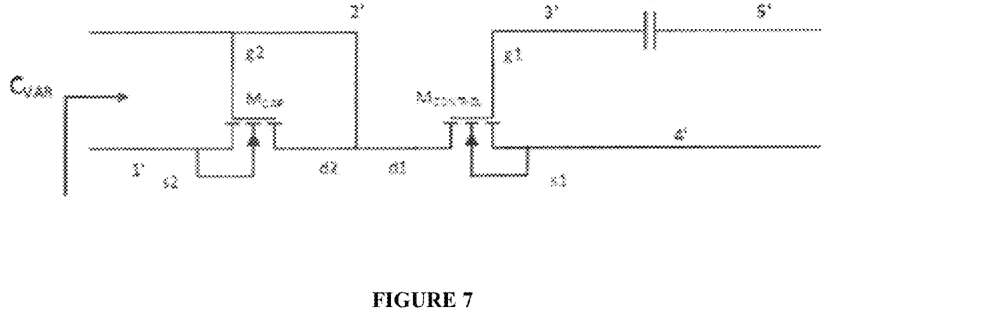
FIG. 7 is an embodiment of an equivalent circuit model according to the invention of the compound varactor which provides the feedback network $VC1_{MOD}$ as shown in FIG. 6.

An embodiment of an equivalent circuit model for a compound varactor is shown in FIG. 7. The control indicated in the figure situated at node (5') is connected to node (5) in the full circuit as shown in FIG. 1. Node (4'), the source of the transistor $M_{CONTROL}$ is connected directly to ground. The resulting capacitance $C_{VAR}$ is seen between node (2') and node (1'). With reference to FIG. 1, each node designation value corresponds with each other; i.e., nodes (1) and (1') are the same, as are nodes (2) and (2') (the gate of the transistor $M_{CAP}$) and nodes (3) and (3'). Manipulation of $C_{VAR}$ is established as follows: the control is taken at node (5') or output terminal ($T_{OUT}$), the point which provides the bias to gate (g1) of $M_{CONTROL}$. Decoupling capacitor (C4) providing DC isolation from the output and the feedback loop.

A positive bias is applied at the gate of $M_{CONTROL}$ from node 4' resulting in the accumulation of charge underneath the gate (g1)'s oxide. This results in the formation of a channel from source (s1) to drain (d1) composed entirely of electrons. Since drain (d1) is also tied to drain (d2) of $M_{CAP}$, the channel extends further into drain (d2) of $M_{CAP}$, which is also tied to the second transistor's gate (g2). An amassing of electrons can be observed at the gate of $M_{CAP}$ rendering it negatively biased. This brings forth a build-up of positive charge on the opposing side of the gate dielectric. These charges recombine with the intrinsic carriers of the semiconductor, creating a depletion region of a certain width. It is the amalgamation of both the gate dielectric (known as $C_{OX}$) and the depletion region ($C_{DEP}$) which encompasses the effective dielectric layer and the concerted behaviour of this system which behaves analogously to variable capacitor $C_{VAR}$. The variability of $C_{VAR}$ is dictated by the depletion width, which in turn is manipulated by the extent of the bias of gate (g1) of $M_{CONTROL}$. Since source (s2) is directly connected to the positive terminal of the input source, the positive polarity further induces a reverse bias, thus enhancing the effective capacitance.

Ultimately, what results from the construction is a capacitance gain from the compound varactor's input (control) to the output which is $C_{VAR}$. Thus, a slight change at node 5' will be amplified as the effect cascades towards the output terminals of the feedback loop. Finally, the AC signal that is generated and sustained by the oscillating network sees the path of least impedance as it commutes within the feedback loop; in this case, the path includes the capacitance between the $M_{CONTROL}$ gate (g1) and source (s1) terminals, (g1) and (d1)/(d2) terminals, and exiting the feedback network through capacitance between the $M_{CAP}$ gate (g2) and source (s2) terminals. These capacitances are collectively known as "parasitic capacitance" and are an intrinsic property of most known MOSFET architecture.

Inductor (L1) as may be a spiral inductor or a fractal loop inductor, for example a fractal loop inductor that includes only a single fabrication layer, such as a sub-200 nm metal film. Such inductors may be characterized in terms of raw inductance, resistance values, quality factor and sheet properties, such as sheet resistance and the inductance per sheet/square (which is meant to measure how much inductance is available for each square of resistance). The inductance per square/sheet is relevant for extremely thin electrodes. For deposition on flexible substrates, while 1 µm is possible with notable limitations, sub-200 nm metal films offer higher cracking-resilience.

A key advantage to a fractal loop inductor is the surface area provided for better inductive performance. A fractal loop inductors uses fractals, such as the Hilbert and Koch fractal to increase the surface area. Because higher order fractals result in a lengthened conductive pathway, both self-inductance, the inductance from an individual loop, and mutual inductance, the inductance from interacting magnetic field of proximal electrodes is enhanced. Consequently, it is important that the signal's magnetic component is able to interact with the coupling features of the fractal geometry.

Figures 8A, 8B, 8C, 8D, 8E, 8F, 8G:
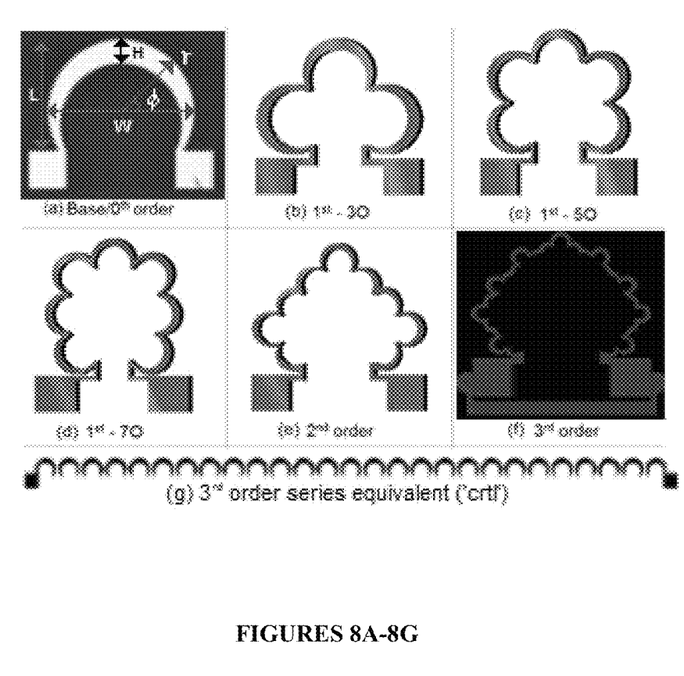

FIGS. 8(a) and 8(f) show realized fractal inductors and are typically fabricated with a highly conductive material. The $1^{st}$ order fractal inductor may be constructed with a various number of loops. An instance of a $1^{st}$ order structure using three loops (designated as "$1^{st}$-3O", wherein "O" refers to the number of loops) is shown in FIG. 8(a) and may be constructed from a basic loop structure by resealing it to half size, then placing the respective number of copies in a manner that resembles the original shape. Due to the curvature of the 0th order loop, some "overshooting" at the connection points results if left unaltered; these can be subsequently removed to avoid any possible fringing capacitance, for example by using a tapered trace-width. A similar procedure can be used for the other inductors shown in FIGS. 8(b) to 8(d). The number of loops for the $1^{st}$ or greater order fractal is not restricted to just 3 loops, and can include any number of loops greater than 1. The loops used in the fractal inductors have an axis of symmetry without a corner.

To arrive at the $2^{nd}$ order fractal inductor as shown in FIG. 8(e), the $1^{st}$-3O structure may be resized appropriately then the copies laid out in semblance to it. For the $3^{rd}$ order, as shown in FIG. 8(f), the increasing complexity may result in more prominent overshoots at the adjoints, since they are naturally linked at more acute angular points; and which can be eliminated to finalize the structure.

Experiments and analysis demonstrate that $3^{rd}$ order fractal inductor is suitable as it optimizes both the inductance and resistance metrics, with the $2^{nd}$ order fractal inductor also useful. $3^{rd}$ order fractals and fractal inductors in general, are able to maintain a high inductance per sheet rating because of their geometry, which includes recursive loops in close proximity to each other, and is conducive to mutual magnetic coupling. Placing the loops in series also provides excellent coupling, because the effective length of the loops in series is longer than the fractal equivalent and the electrode width when used in series, is a fraction of the original loop, so these structures show higher sheet resistance. The inductive enhancement of fractal loop inductors can be configured to outweigh the resistive degradation.

In low-cost applications of the fractal loop inductors, which may restrict the fabrication process to a single layer, the sheet properties of the inductors are important. For applications wherein conductor consumption is a concern, the conductor area taken up by each structure is a consideration.

In printable electronic applications the area of the electrode is important and in cases, is preferably minimized. The conductor area saved may be determined according to equation (1a) for the base ('base') and (1b) for the control ('ctrl'). In this embodiment, the control structure is taken as the scaled-down loop of each fractal and chaining each loop together in series (an example of a control structure for the $3^{rd}$ order fractal is shown in FIG. 8(g)).

$$\text{Conductor Area saved (base)} = \left[\frac{\text{(Area of base} - \text{Area of fractal)}}{\text{Area of base}}\right] \times 100\% \quad (1a)$$

$$\text{Conductor area saved (Ctrl)} = \left[\frac{\text{(Area of series} - \text{Area of fractal)}}{\text{Area of series}}\right] \times 100\% \quad (1b)$$

In this example of the $3^{rd}$ order loop fractal inductor, an almost 75.8% reduction is found for the highest order for the base comparison, and a 47.9% reduction for the control. For the control layouts, however, the reduced conductor consumption for the fractal equivalent is due to the elimination of overshoots when placing the loops in a fractal layout. In general, although the inductance gain is better than the fractal equivalents, the associated resistance degradation puts this geometrical strategy at a disadvantage.

Sheet resistance analysis at a thickness of 180 nm reveals that for the first two orders, the resistance per square is lower than the basic loop inductor, up until 3rd order fractal which exhibited a slight degradation. However, when comparing sheet resistance to the measured inductance (inductance per square) for each geometry, a clear improvement results. The assessed sheet resistance is consistently higher with the series configuration equivalents than the comparable fractal structure. In addition, the inductance per sheet resistance for the control produces poorer ratings, with the exception of the 3rd order equivalent structure Improvements in the sheet resistance are a result of the effective lengthening and narrowing of the electrode as the fractal increases in order. A thickness of electrode may be selected to improve the sheet resistance without degradation of the inductance.

Experiments in doubling the electrode width for all fractal orders higher than zero found that for the $3^{rd}$ order the inductance decreased by approximately half of the original amount, and the resistance fell to under a quarter of the original electrode width. Furthermore, the experiment showed that doubling the electrode width dramatically reduces the effective sheet resistance at higher orders. In other words, the actual resistance reduced faster than the number of squares from a geometrical argument. An electrode width may be used to provide an optimal inductance and resistance balance or "Q-factor" that is suitable for the design.

An alternative embodiment of the fractal loop inductor provides multiple conductive paths in parallel through which current can flow to decrease the resistance of the inductor.

In another alternative embodiment similar or identical fractal loop inductors may be connected in a series or parallel orientation.

Although $3^{rd}$-3O order fractal loop inductors may use 27 loops, the effective number of loops in such an inductor is $N_{eff}=15$ to obtain the same inductance rating (an effect of fractal dilution). Hence, the $3^{rd}$-3O order fractal could be optimized using just 15 loops while maintaining the same scaling factor $\epsilon$, and the same inductance would be obtained. The alternative is a structure with 27 loops with scaling factor of $\epsilon=1/19$, which may be the less ideal design optimization approach. The manner in scaling $\epsilon$ is also at the behest of the designer. In experiments $\epsilon$ was scaled according to the radius of a particular fractal order with respect to the base/$0^{th}$ order structure. Scaling $\epsilon$ according to, for example, electrode width, or height, etc. are also valid parameters.

While the embodiments of fractal loop inductors described above relate to $0^{th}$, $1^{st}$, $2^{nd}$ and $3^{rd}$ order fractals, higher order fractals may be used.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

The discrete systems illustrated above coalesce to provide the desired self-oscillating boost converter for low voltage applications. For example, the systems can be utilized to drive or charge a variety of devices requiring a specific voltage such as, but not limited to, digital power, electronic power supplies, super-capacitors for energy storage and portable electronics. It is also possible to use the systems in the stabilization of variable input sources whether the system is controlled from the input itself (via an open loop schematic) or the output (via a closed-loop schematic). The present invention has been tested and designed in the frequency range designated "very high" or from 30 MHz to 300 MHz but is not limited to this range, and those whom are proficient in the field may easily ascertain the permutation of circuit element values which provide the desired operating frequency range. As such, the scope of this invention is not bounded by the specifics exercised throughout the development and disclosure thereof, but rather the claims following.

What is claimed is:

1. An analog open-loop self-oscillating boost converter comprising:
   an output terminal for supplying an output voltage bus;
   an input terminal for receiving variable input power;
   a varactor positioned in series with the input terminal; and
   an oscillating network having an inductor, a resistor and a capacitor in a parallel orientation, the oscillating network connected to a semiconductor device and the varactor.

2. The converter of claim 1, wherein the resistor limits a current entering a gate of a switch.

3. The converter of claim 2 further comprising a switching semiconductor device, the gate of the switching semiconductor device connected to a drain of the switch.

4. The converter of claim 1, wherein the inductor is a fractal loop inductor.

5. The converter of claim 4, wherein the fractal loop inductor comprises a single fabrication layer.

6. The converter of claim 4, wherein the fractal loop is a Hilbert and Koch fractal.

7. The converter of claim 6, wherein the fractal loop inductor comprises a 0th order fractal loop.

8. The converter of claim 6, wherein the fractal loop inductor comprises a first order fractal loop.

9. The converter of claim 6, wherein the fractal loop inductor comprises a third order fractal loop.

10. The converter of claim 6, wherein the fractal loop inductor comprises a second order fractal loop.

11. The converter of claim 10, wherein the fractal loop includes a plurality of conductive paths.

12. An analog closed-loop self-oscillating boost converter comprising:
   an output terminal for supplying an output voltage bus;
   an input terminal for receiving variable input power;
   a varactor positioned in series with the input terminal;
   an oscillating network having an inductor, a resistor and a capacitor in a parallel orientation, the oscillating network connected to a semiconductor device and the varactor; and a feedback network from the output terminal to the input terminal.

13. The converter of claim 12, wherein the feedback network comprises a variable capacitor.

14. The converter of claim 12, wherein the feedback network comprises a second varactor.

15. The converter of claim 12, wherein the feedback network is configured to maintain a desired stable output voltage at the output terminal.

16. The converter of claim 12, wherein the input terminal receives a varying voltage input.

17. The converter of claim 12, wherein the inductor is a fractal loop inductor.

18. The converter of claim 17, wherein the fractal loop inductor has a plurality of loops, each of the loops having at least one axis of symmetry.

19. The converter of claim 18, wherein the fractal loop inductor is of any fractal order of $1^{st}$ order or higher.

20. The converter of claim 19 further comprising a second fractal loop inductor of the same order and number of loops as the first fractal loop inductor, wherein the first and second fractal loop inductors are connected in a series orientation.

21. The converter of claim 19 further comprising a second fractal loop inductor of the same order and number of loops as the first fractal loop inductor, wherein the first and second fractal loop inductors are connected in a parallel orientation.

22. The converter claim 20, wherein multiple conductive pathways lead from the fractal loop inductor.

\* \* \* \* \*